Sept. 3, 1935.  W. F. WILM  2,012,980
ELECTRIC METERING SYSTEM
Filed April 24, 1934
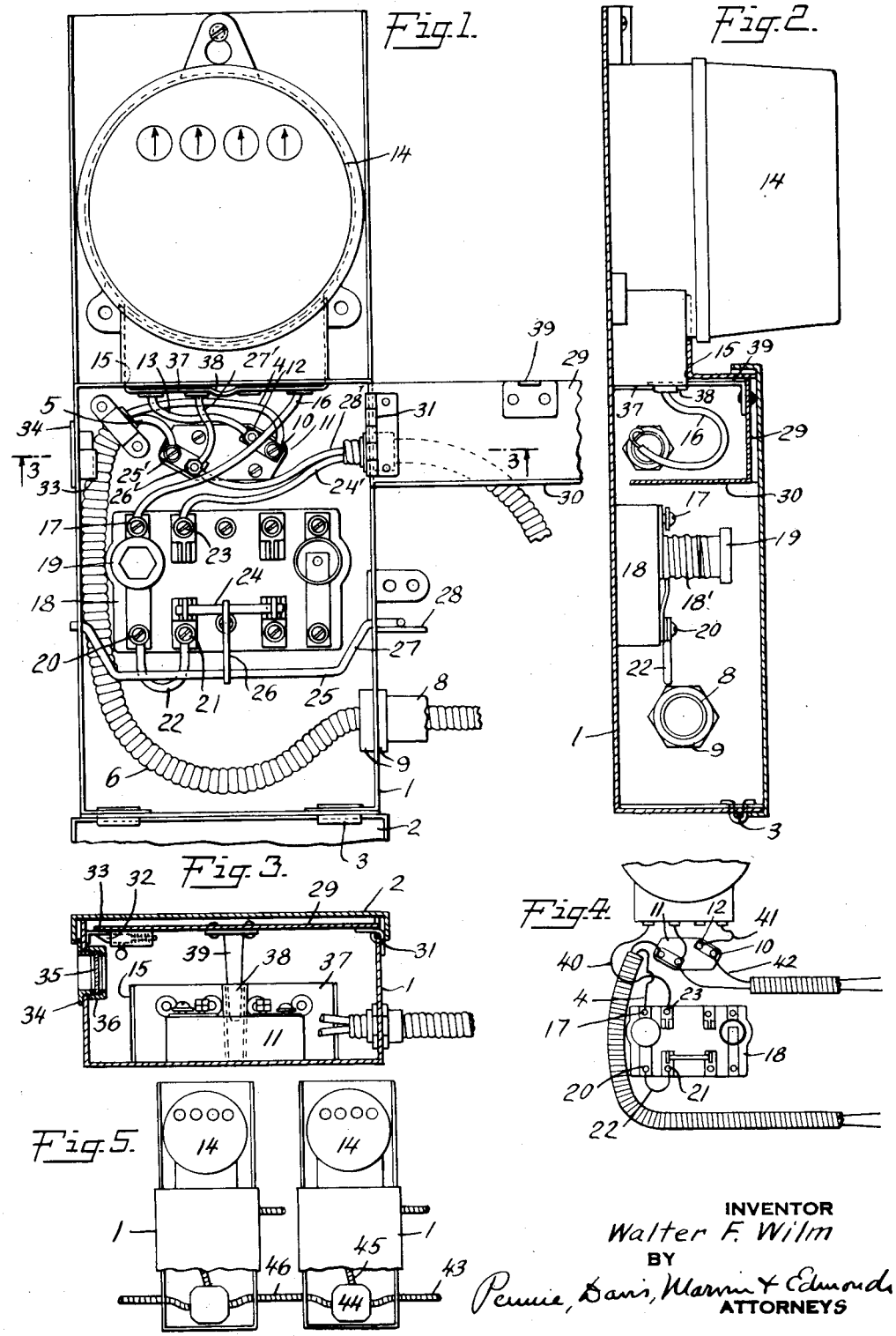
INVENTOR
Walter F. Wilm
BY
Pennie, Davis, Marvin & Edmonds
ATTORNEYS Patented Sept. 3, 1935

2,012,980

UNITED STATES PATENT OFFICE 2,012,980

ELECTRIC METERING SYSTEM

Walter F. Wilm, Brooklyn, N. Y., assignor of one-half to Milton M. Eisenberg

Application April 24, 1934, Serial No. 722,075

3 Claims. (Cl. 247—2)

This invention relates to systems for distributing electricity.

In the usual arrangement of electric meters for measuring the consumption of current in houses, apartments and other buildings, the line wire is connected to one terminal of a fuse socket on a switch block. From the fuse the circuit extends to the meter and then to one of the switch terminals. With such an arrangement it is possible for the consumer to shunt the current around the meter by making a connection between two adjacent terminals on the switch block. The loss of considerable revenue is suffered by the electric power companies in this way.

In the present invention I provide a system in which the line wires are shielded by a B-X cable or other means to prevent access to them. The shielded wires extend into a compartment in the switch box to which access by the consumer is prevented. A meter testing block is arranged in this compartment to permit testing of the meter in the usual way. The incoming positive wire may be connected to one of the terminals of the testing block, then to the meter, then to the fuse and house switch, or it may be connected first to the fuse and switch, then to the meter and testing block. In either instance the connections are so made that shunting of the current around the meter is prevented.

A further advantage of the invention is that it simplifies the disconnecting of current to a house, apartment or other building, when the current is cut off for nonpayment of bills or for other reasons. The present practice is to remove the fuse from the switch box and insert a device known as a "lock fuse" which breaks the circuit and which can not be readily removed. However, it is still possible to shunt the current around the fuse socket by a bridging connection. While such current registers on the meter it permits the use of current by a consumer in arrears on payment when such use is not intended. The compartment to which access by the consumer is prevented is so arranged that instead of removing the fuse the lead wires to the switch block can be disconnected and arranged in this compartment in such manner that proper connections can not be made to supply current to the building without leaving evidence that the switch box has been tampered with. As a further precaution the locking means controlling this compartment may be arranged to lock the meter to the top of the switch box and prevent access to the compartment by the removal of the meter.

In the accompanying drawing I have shown several embodiments of the invention. In the drawing:

Fig. 1 is a front elevation of a switch box and meter with the cover of the switch box in open position;

Fig. 2 is a side elevation with the cover in closed position;

Fig. 3 is a horizontal, sectional view on line 3—3 of Fig. 1;

Fig. 4 is a diagrammatic view of the switch block and meter showing an alternate arrangement of wiring connections; and Fig. 5 is a diagrammatic view showing several switch boxes connected to the line wire for use in apartments, etc.

Referring to the drawing the reference numeral 1 designates generally a switch box of the usual construction. One of the advantages of the present invention is the provision of a wiring system in which the present switch boxes and meters can be used without substantial alteration. The front of the switch box is normally closed by a cover 2 hinged at the bottom thereof, as indicated at 3. One side wall of the switch box is provided with an opening for entrance of the line wires. The line wires are designated by the reference numerals 4 and 5, and are shown shielded by a flexible tubing 6, such as the usual B-X cable. This cable extends from the service switch (not shown) to the upper portion of the switch box. A pipe 8 may be arranged in the opening through which the line wires pass and may be secured in position by nuts 9.

In the arrangement shown in Fig. 1 of the drawing, the line wires project from the end of the B-X cable in the upper portion of the switch box and the positive wire 4 is connected to a terminal 10 on a meter testing block 11. The meter testing block is made of insulating material in the usual manner. The terminal 10 is in turn connected to a terminal 12 and from this terminal a lead wire 13 extends to the meter. As shown, a meter 14 rests upon the top of the box and projects through an opening 15 therein. From the meter the positive side of the circuit is connected by a wire 16 to a fuse socket terminal 17 on a switch block 18. The switch block 18 is likewise made of suitable insulating material. Terminal 17 is connected to a socket 18' adapted to receive a fuse 19 and the other side of the socket is connected to a terminal 20. A switch terminal 21 is arranged adjacent the fuse socket terminal 20 and is connected thereto by a wire 22. A similar switch terminal 23 is arranged at the opposite side of the switch block and the two terminals are adapted to be connected by the usual manually operated switch 24. This switch is connected to an operating member 25 by a link 26, the operating member being provided with crank portions 27 and being further provided with an operating handle 28 arranged on the exterior of the box. The fuse block as shown is provided with duplicate switch terminals and fuse socket and with a double knife switch to permit the use of the apparatus in connection with circuits employing 250 volts. From the switch terminal 23 the positive side of the circuit is connected to the house by a wire 24'.

The negative wire 5 extends to a terminal 25' on the meter testing block 11 which is connected to a terminal 26'. From this terminal a ground wire 27' extends to the meter and another wire 28' extends to the house circuit. To prevent access to the upper portion of the switch box in which the connections are arranged, I provide a closure member consisting of a vertical wall 29 and a horizontal wall 30. This member is hinged to one side of the switch box adjacent the top as indicated at 31. When in the closed position shown in Fig. 2 of the drawing, the vertical wall 29 is arranged inside the cover and the horizontal wall 30 extends toward the back of the box to prevent access to the compartment formed thereby. When the circuit has been connected this member is arranged in closed position and means are provided for preventing access to the interior of this compartment. As shown, a spring pressed latch 32 is carried on the free edge of the wall 29 and is adapted to cooperate with a clip 33 on the opposite side of the switch box. At a point adjacent the latch, when the latch is in closed position, the side wall is provided with an opening having a bushing 34 arranged therein. This bushing is adapted to receive a glass 35 which is retained in position by a threaded sleeeve 36. The closure member is also provided with means for locking the meter in position above the switch box so that unauthorized access to the connections cannot be obtained by removing the meter. As shown, the meter is provided with a bottom plate 37 which projects into the opening 15 at the top of the switch box. This plate may be provided with a slightly offset portion 38 to receive a locking member 39 carried by the closure member.

In Fig. 4 of the drawing I have shown an alternate arrangement of connections. As shown, the positive line wire 4 is connected to the fuse socket terminal 17. From the fuse socket terminal 20 connection is made to the switch terminal 21 by wire 22 as heretofore described. From the switch terminal 23 a wire 40 is connected to the meter and wire 41 from the meter is connected to the terminal 12 on the meter testing block 11. From the terminal 10 a wire 42 extends to the house circuit. The return side of the circuit is connected in the manner heretofore described in connection with Fig. 1.

In Fig. 5 of the drawing I have shown an arrangement whereby a plurality of meters in a single building, such as an apartment, are connected to the line wires. As shown, the shielded line wires 43 extend into the building to a switch box I and within the switch box I provide a junction box 44 which is closed and which prevents access to the line wires. Wires 45 extend from the junction box to the upper portion of the switch box and these wires are shielded as heretofore described. Likewise wires 46 extend from the junction box to the next switch box I.

In the arrangement shown in Fig. 1 of the drawing it is impossible to shunt the current into the building without passing through the meter because the consumer only has access to that portion of the switch box in which the switch block is mounted. As the current passes from the meter testing block to the meter and thence to the switch block any shunting of current at any of the terminals on the switch block would cause the shunted used current to register on the meter. The glass 35 may be of some distinguishing design so that if the consumer should break this glass to change the connections and then replace it by a glass of the same size, it would at once be apparent to a representative of the electric power company that the box had been tampered with. Likewise, the closure member prevents the meter from being removed to alter the connections through access to the switch box through opening 15. In the form of the invention shown in Fig. 4 of the drawing, the positive line wire is first connected to the fuse socket 18, then to the meter, then through the testing block to the house circuit. While it is theoretically possible to shunt current from the circuit at any of the terminals on the switch block, without passing the current through the meter, the connections on the return side of the circuit are all inaccessible and it would therefore be a difficult matter to connect such shunted current to the house circuit.

I claim:

1. In a device of the character described, a switch box having an opening in the top thereof, a meter arranged on said box and extending into said opening, a member hinged to one side of said box and adapted to close the portion of said box immediately below the bottom of said meter to render it inaccessible, a latch carried by said member operable from the inside of said box, said box being provided with an opening adjacent said latch, and frangible means for closing said opening.

2. In a device of the character described, a switch box having an opening in the top thereof, a meter arranged on said box and extending into said opening, a right angle member hinged to one side of said box and adapted to prevent access to the upper portion of said box when said member is in closed position, means for locking said member in closed position, terminals arranged in the upper part of said box, shielded line wires extending into the inaccessible portion of said box and connected to said terminals, a switch block in the accessible portion of said box, and connections between said meter, said terminals and said switch block.

3. In a device of the character described, a switch box having an opening in the top thereof, a meter arranged on said box and extending into said opening below the top of said box, a member hinged to one side of said box and adapted to close the portion of said box immediately below the bottom of said meter, means for locking said hinged member in closed position, and a locking member carried by said hinged member and adapted to engage the portion of said meter extending in said box to prevent removal of said meter when said hinged member is in closed position.

WALTER F. WILM.